(12) United States Patent
Drechsel (10) Patent No.: US 9,592,518 B2
(45) Date of Patent: Mar. 14, 2017

(54) JET DIFFUSER DEVICE WITH QUICK-REPLACEABLE NOZZLE FOR IRRIGATION SYSTEMS

(71) Applicant: Arno Drechsel, Lienz (AT)

(72) Inventor: Arno Drechsel, Lienz (AT)

(*) Notice: Subject to any disclaimer, the term of this patent is extended or adjusted under 35 U.S.C. 154(b) by 51 days.

(21) Appl. No.: 14/235,749

(22) PCT Filed: Oct. 31, 2012

(86) PCT No.: PCT/IB2012/056043
§ 371 (c)(1),
(2) Date: Jan. 28, 2014

(87) PCT Pub. No.: WO2013/064989
PCT Pub. Date: May 10, 2013

(65) Prior Publication Data
US 2014/0231544 A1    Aug. 21, 2014

(30) Foreign Application Priority Data
Nov. 4, 2011  (IT) ............................. VI2011A0295

(51) Int. Cl.
*B05B 15/06* (2006.01)
*B05B 1/16* (2006.01)
(Continued)

(52) U.S. Cl.
CPC ............ *B05B 3/063* (2013.01); *B05B 3/0486* (2013.01); *B05B 15/065* (2013.01); *B05B 1/16* (2013.01); *B05B 1/262* (2013.01); *B05B 3/008* (2013.01)

(58) Field of Classification Search
CPC ...... B05B 3/008; B05B 3/0486; B05B 15/065; B05B 3/063
(Continued)

(56) References Cited

U.S. PATENT DOCUMENTS 5,234,169 A * 8/1993 McKenzie .............. B05B 15/10
239/201
5,699,962 A * 12/1997 Scott ...................... B05B 15/065
239/391
(Continued)

FOREIGN PATENT DOCUMENTS

FR        862370      3/1941
FR        2171547     9/1973
(Continued)

*Primary Examiner* — Arthur O Hall
*Assistant Examiner* — Christopher R Dandridge
(74) *Attorney, Agent, or Firm* — Themis Law (57) ABSTRACT

A jet diffuser with a quick-change nozzle for use in irrigation systems includes an upper supply portion with a main body that has an upper tubular portion with a longitudinal axis, which is designed to be connected to a drop line and a lower hollow portion having a central cavity and a side wall, in which a lateral opening is formed, a nozzle adapted to be radially inserted into the cavity through the lateral opening in substantially coaxial and facing relationship to the upper tubular portion to direct a liquid jet axially downwards, and a quick-connect system associated with the nozzle for securing it within the main body and including cam and follower drive elements operating on the nozzle to move it and push it axially upwards into substantial contact and sealing relationship to the lower edge of the upper tubular portion, possibly with no seal interposed therebetween.

12 Claims, 8 Drawing Sheets

(51) Int. Cl.
  *B05B 3/06*  (2006.01)
  *B05B 3/04*  (2006.01)
  B05B 1/26  (2006.01)
  B05B 3/00  (2006.01)

(58) Field of Classification Search
  USPC ....... 239/600, 214, 392, 442, 222, 391, 397,
    239/463, 483, 484; 285/325, 326, 305,
    285/308, 320
  See application file for complete search history.

(56) References Cited

U.S. PATENT DOCUMENTS

| 7,354,077 B1* | 4/2008 | Jumonville | F16L 37/18 |
| | | | 285/312 |
| 2009/0321543 A1* | 12/2009 | Lawyer | B05B 15/065 |
| | | | 239/600 |
| 2010/0102149 A1* | 4/2010 | Lawyer | B05B 15/065 |
| | | | 239/722 |

FOREIGN PATENT DOCUMENTS

| WO | 9748939 | 12/1997 |
| WO | 2010005508 | 1/2010 |

* cited by examiner

JET DIFFUSER DEVICE WITH QUICK-REPLACEABLE NOZZLE FOR IRRIGATION SYSTEMS

FIELD OF THE INVENTION

The present invention generally finds application in the field of irrigation systems for agricultural and industrial use, and particularly relates to a jet diffuser with a quick-change nozzle, for use in an irrigation system.

BACKGROUND ART

Liquid diffusers for irrigation systems are known to comprise a main body which is adapted to be secured to a drop line of an irrigation system and has a tubular passage with one end designed for connection to the supply line and the other end equipped with a diffuser nozzle directing a liquid jet downwards.

Furthermore, a deflector plate is placed before the nozzle, for obstructing and radially deflecting the jet, for the liquid to be uniformly distributed over the surface to be irrigated.

The plate may be mounted to the support body in either fixed or movable fashion, to be able to perform a complex motion, composed of a first rotation about its center axis and a second rotation of its center axis about a center axis of the support body.

Generally, the jet-emitting nozzle is mounted in the main body in removable fashion, for replacement thereof if the jet range has to be changed.

Here, the whole diffuser is removed from the supply pipe and then at least partially disassembled for nozzle removal and replacement.

As a result, in addition to the need of disassembling the diffuser, there will be also the need of stopping the irrigation liquid supply, which will increase dead times and require more labor and personnel.

A further drawback of these prior art arrangements is difficulty in performing ordinary maintenance, particularly when soil or dirt residues must be removed.

WO2010/005508 discloses a diffuser having a quick-change nozzle that allows replacement of the nozzle when the support body is still connected to the supply pipe, without requiring the supply to be stopped and the diffuser to be disassembled.

Nevertheless, this arrangement also has a few well-known drawbacks. Namely, the support body has a lateral seat for receiving the nozzle and for quick-locking thereof, by merely transverse motion.

As a result, for a proper sealing effect to be obtained at the connector section of the nozzle for connection with the liquid delivery passage, a special seal, generally an O-ring, has to be provided, which adds complexity to both construction and assembly of the diffuser.

DISCLOSURE OF THE INVENTION

The object of the present invention is to overcome the above drawbacks, by providing a liquid diffuser with a quick-change nozzle, for use in irrigation systems, that has characteristics of high efficiency and relative cost effectiveness.

A particular object is to provide a liquid diffuser with a quick-change nozzle that ensures high reliability and has a simple construction.

Another object is to provide a liquid diffuser with a quick change nozzle in which the nozzle can be easily inserted and extracted but can be still stably and safely secured thereto.

A further object is to provide a liquid diffuser with a quick-change nozzle that affords quick and simple completion of ordinary maintenance steps, without requiring water supply to be stopped.

Yet another object is to provide a liquid diffuser with a quick-change nozzle that always ensures a proper sealing effect.

These and other objects, as better explained hereinafter, are fulfilled by a jet diffuser with a quick-change nozzle for use in an irrigation system, wherein the diffuser comprises an upper supply portion and a lower deflecting portion, wherein said supply portion comprises a main body having an upper tubular portion with a longitudinal axis, which is designed to be connected to a respective drop line and a lower hollow portion having a side wall and a central cavity, a lateral opening formed in said side wall of said lower hollow portion, a substantially tubular nozzle adapted to be radially inserted through said lateral opening and placed in said central cavity in substantially coaxial and facing relationship to said upper tubular portion to direct a liquid jet axially downwards, quick-connect means associated with said nozzle for securing it within said main body and wherein said diffuser portion comprises diffuser means for distributing the jet that flows out of said nozzle.

The diffuser is characterized in that said quick-connect means comprise cam and follower drive means operating on said nozzle to move it and push it axially upwards substantially into contact and sealing relationship to the lower edge of the upper tubular portion, with no seal interposed therebetween.

With this particular configuration, the nozzle may be quickly inserted into or removed from the housing seat specially formed in the support body without requiring water supply to the system to be stopped.

This is because the lateral opening of the main body will always provide access to the housing cavity of the nozzle, transverse to the liquid jet that flows out of the upper tubular portion, which will facilitate insertion and removal, as the operation will not oppose the jet direction.

Furthermore, access to the nozzle housing cavity will not require the diffuser to be removed from the supply line or disassembled.

The cam and follower drive means will move the nozzle against the lower edge of the tubular portion and force it thereagainst to ensure a proper sealing effect without requiring the use of a seal, such as an O-ring, at the outlet or on the upper section of the nozzle.

As a result, the diffuser will have a simpler construction, which allows easier assembly and is less prone to failure.

Advantageous embodiments of the invention are obtained in accordance with the dependent claims.

BRIEF DESCRIPTION OF THE DRAWINGS

Further characteristics and advantages of the invention will be more apparent from the detailed description of a preferred, non-exclusive embodiment of the diffuser according to the invention, which is described as a non-limiting example with the help of the annexed drawings, in which.

DETAILED DESCRIPTION OF A PREFERRED EMBODIMENT

Referring to the above figures, a liquid diffuser is shown, which is adapted for use in an irrigation system I for agricultural and/or applications, of the type having a supply pipe T for supplying an irrigation liquid, generally water.

Particularly, the diffuser of the invention, generally designated by numeral 1, will be of the type commonly defined as "sprinkler", adapted to be suspended from a supply pipe, for example and without limitation in center pivot systems.

Figure 1:
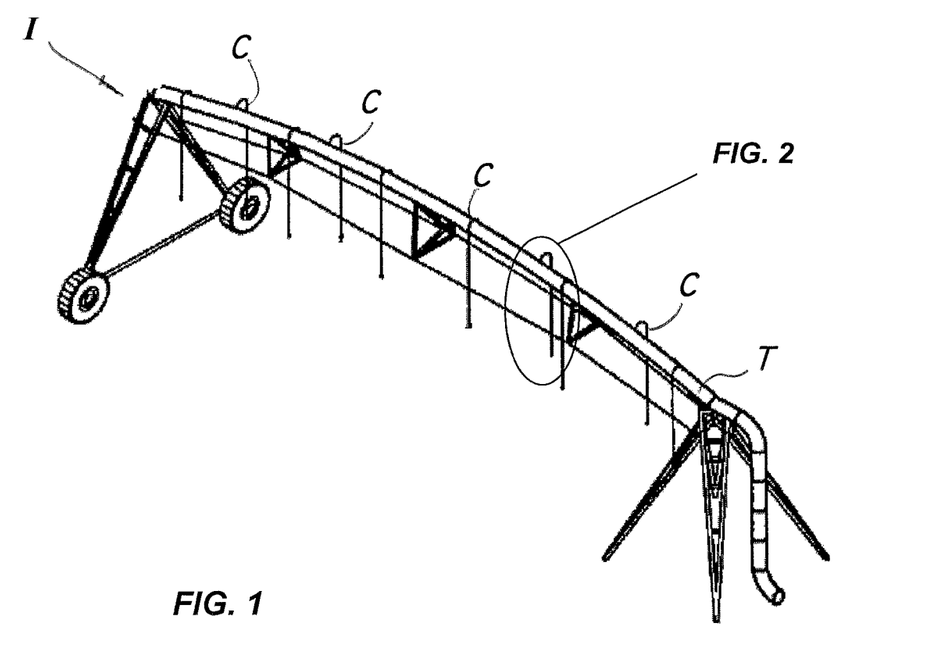
FIG. 1 is a perspective view of an irrigation system comprising a plurality of diffusers of the invention.
Figure 2:
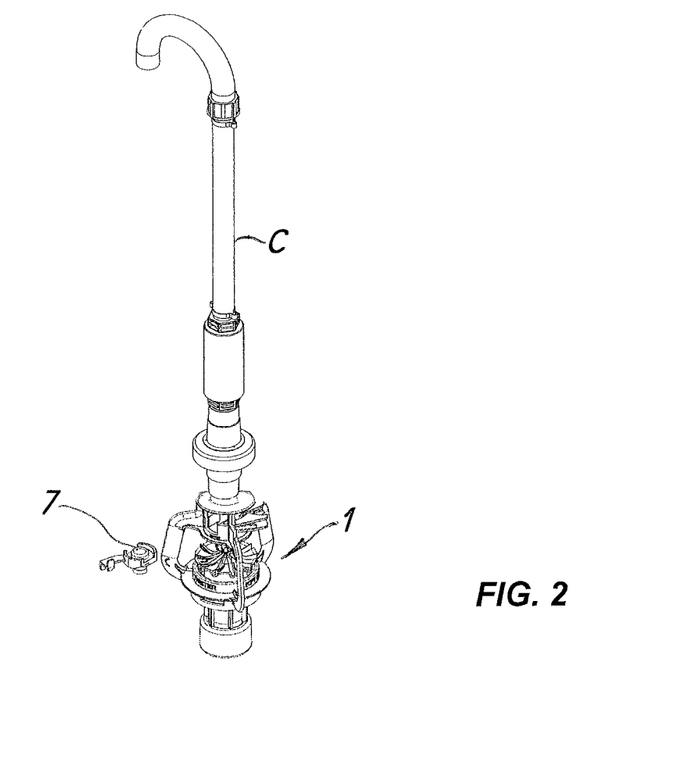
FIG. 2 is an enlarged perspective view of a portion of the irrigation system of FIG. 1 having a diffuser of the invention.

As shown in FIGS. 1 and 2, a system I will have at least one supply pipe T with a plurality of drop lines C, each being adapted to have a diffuser 1 removably secured thereto, for substantially uniform distribution of an irrigation jet over a surface to be irrigated.

Figure 3:
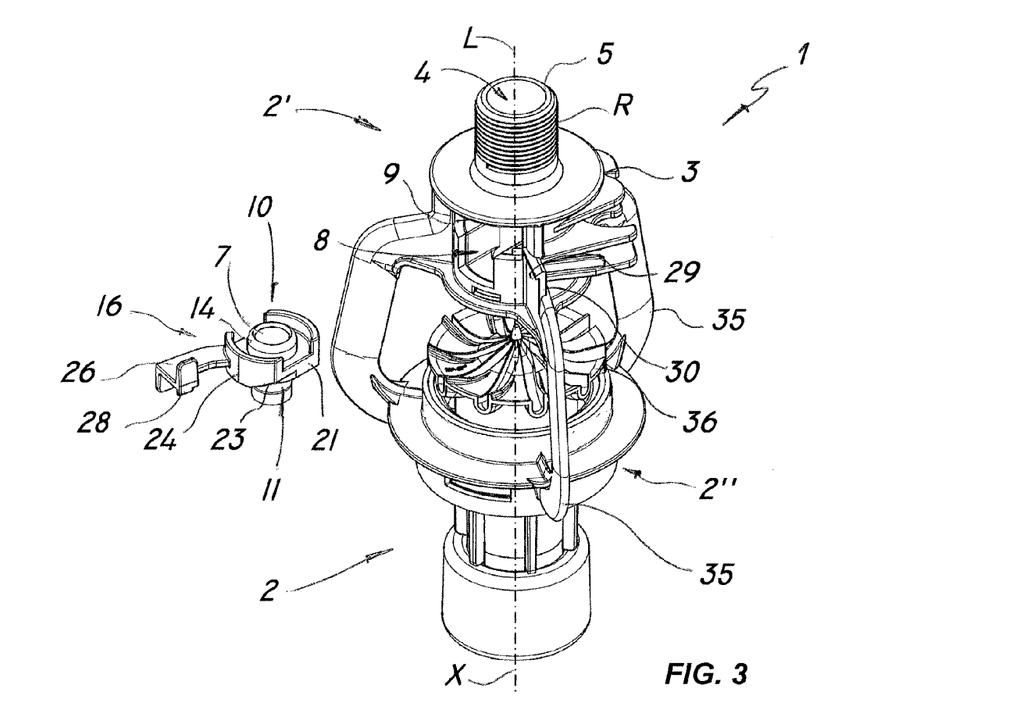
FIG. 3 is an exploded perspective view of the diffuser of the invention.
Figure 4:
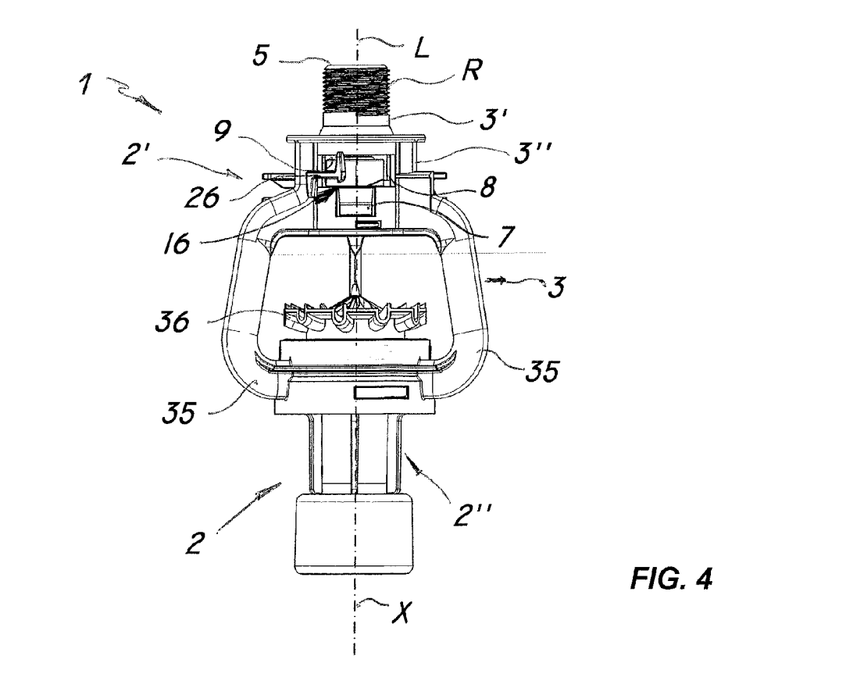
FIG. 4 is a front view of the diffuser of FIG. 3 with the nozzle in a first unlocked position.

As more clearly shown in FIGS. 3 and 4, the jet diffuser 1 of the invention comprises a load-bearing frame 2 having a supply portion 2' overlying a deflecting portion 2".

The supply portion 2' in turn comprises a main body 3 with a longitudinal axis L, having an upper end connection T, e.g. of threaded type, adapted for removable connection to any one of the drop lines C.

Furthermore, the main body 3 has an upper tubular portion 3' having a substantially axial central passage 4 with an inlet 5 and an outlet 6 for the irrigation liquid, and a lower hollow portion 3" with a side wall 3'".

The diffuser 1 also comprises a substantially cylindrical nozzle 7 which is removably coupled to the outlet 6 of the passage 4, in substantially facing relationship to the upper tubular portion 3' to direct a liquid jet downwards toward the deflecting portion 2".

The main body 3 also has a central cavity 8 formed in the lower hollow portion 3" for housing the nozzle 7 substantially coaxial with the central passage 4.

The side wall 3'" of the hollow portion 3" has a substantially transverse lateral opening 9 for insertion/removal of the nozzle 7 into and from the cavity 8 in a substantially transverse direction Y.

The cavity 8 is conveniently disposed downstream from the passage 4 and is designed to house the nozzle 7 in a manner allowing displacement thereof at least in the axial direction.

Quick-connect means are 10 are also provided for connecting the nozzle 7 with the main body 3, which are adapted to allow insertion and removal of the nozzle 7 into and from the cavity 8 without requiring the diffuser 1 to be disassembled or disconnected from the drop line C.

Particularly, the quick-connect means 10 include cam and follower drive means 11 associated with the cavity 8 and the nozzle 7 and operating on the nozzle 7 to move it and push it axially upwards after insertion thereof into the cavity 8 through the lateral opening 9 into contact and sealing relationship with the lower edge 15 of the passage 4 to ensure the required sealing effect possibly with no seal being provided at the outlet 6 or the inlet section 7' of the nozzle 7.

Nevertheless, it shall be understood that, in an alternative configuration, not shown in the accompanying drawings, the diffuser 1 may also include a seal interposed between the nozzle 7 and the outlet 6 of the passage 4 and stably associated with either of these elements.

Conveniently, the cam and follower drive means 11 comprise a first sliding surface 12 associated with the cavity 8 and a second sliding surface 13 associated with the nozzle 7.

The two sliding surfaces 12, 13 will be adapted for mutual engagement by relative sliding motion, to cause translation t of the nozzle 7 as it is inserted into the cavity 8 and locked in place therein.

Figure 11:
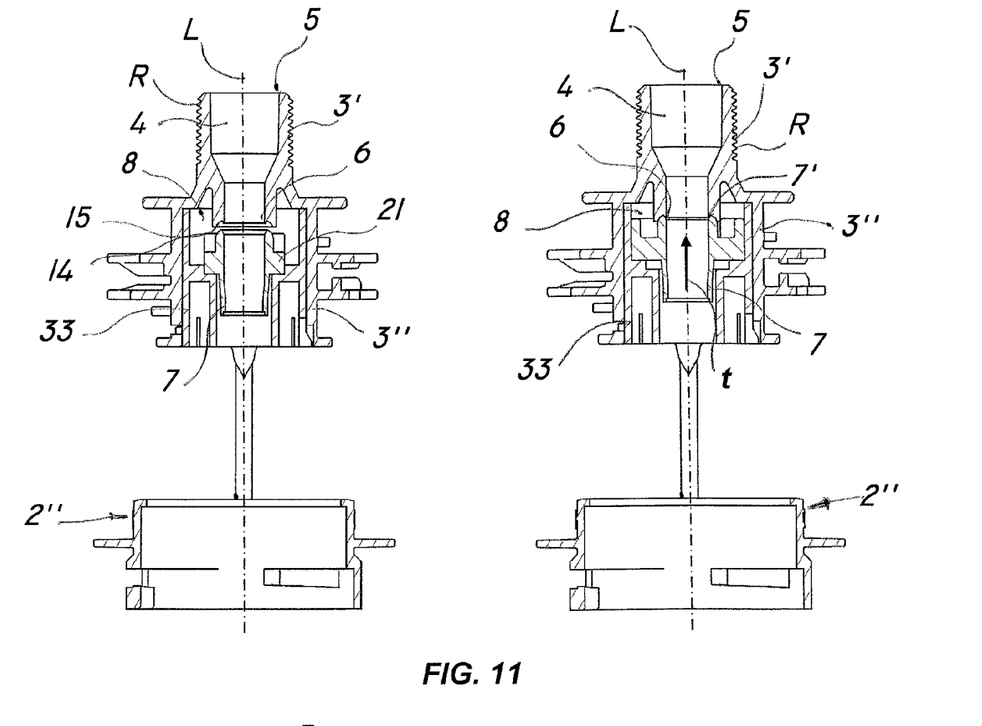
FIG. 11 shows an operation sequence for inserting and locking the nozzle in place with the diffuser being shown in section and in front view.

Particularly, the cam and follower means 11 may be designed to promote translation t of the nozzle 7 from a first depressed position, as more clearly shown in the left image of FIG. 11, in which the nozzle 7 is separated from the passage 4, to a raised position, as more clearly shown in the right image of FIG. 11, in which the nozzle 7 contacts the outlet 6 of the passage 4 and is pressed thereagainst to ensure the required sealing effect.

For this purpose, the nozzle 7 has a flared upper edge 14, and the passage 4 has a matingly shaped lower edge 15, mating with the shape of the upper edge 14 of the nozzle 7 to sealingly receive it upon axial translation t of the nozzle 7, thereby ensuring a sealing effect even when no seal is provided.

In one embodiment, not shown, the cam and follower drive means 11 may be designed to promote such translation t at the same time as the radial sliding movement of the nozzle 7 in the cavity 8.

In the illustrated preferred embodiment, the axial translation t of the nozzle 7 is caused by a rotation $\bar{\omega}$ thereof in the cavity 8, about the longitudinal axis L.

Advantageously, the cam and follower drive means 11 comprise a support and guide element 16 which is integral with the nozzle 7 and adapted to guide and support it as it is inserted into the cavity 8.

Figure 6:
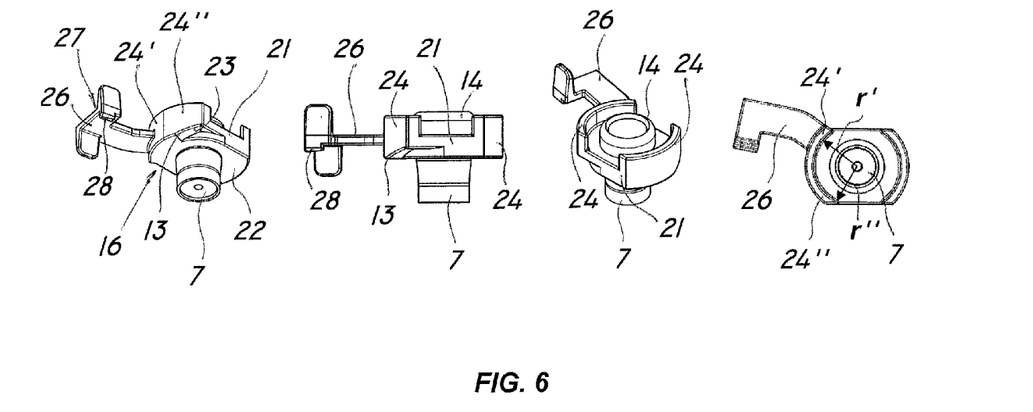
FIG. 6 shows a few views of a quick-change nozzle of the diffuser of the invention.
Figure 7:
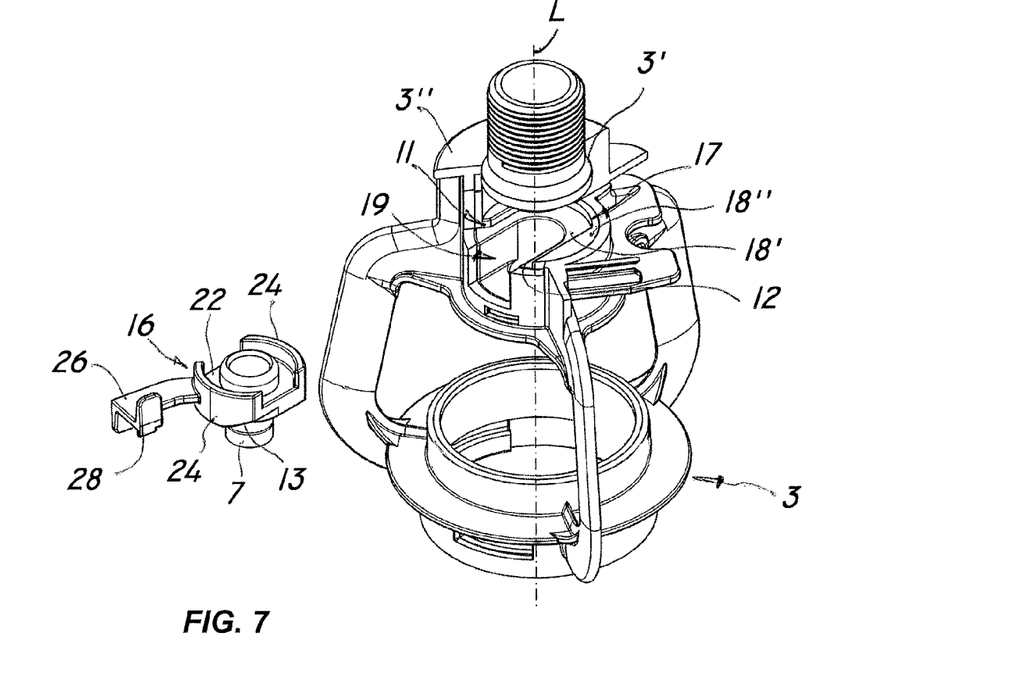
FIG. 7 is a partially sectional perspective view of a part of the diffuser of the invention with the nozzle in the pulled-out position.
Figure 8:
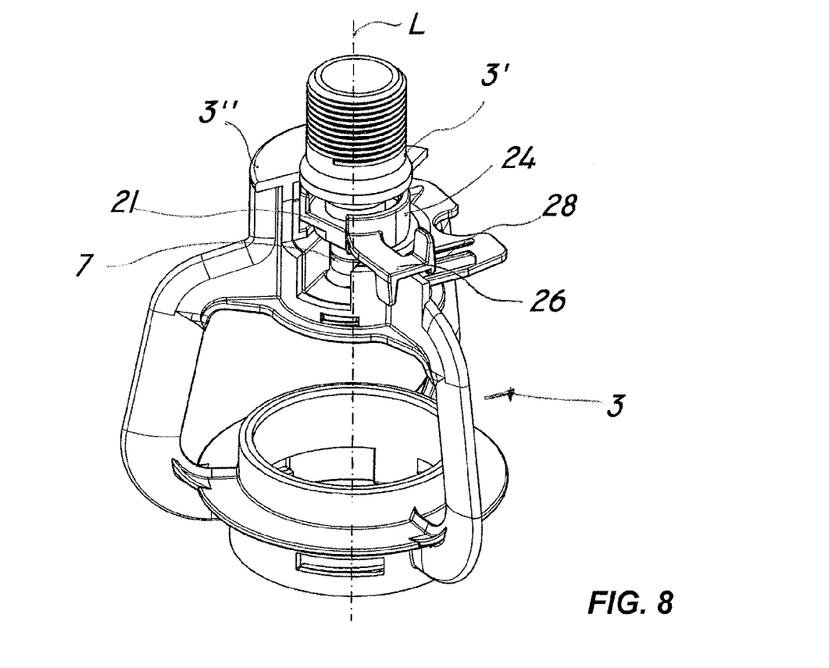
FIG. 8 is a partially sectional perspective view of a part of the diffuser of the invention with the nozzle in the locked position.

Preferably, as shown in FIG. 6, the support element 16 may be formed as a single piece with the nozzle 7, to always ensure proper insertion and centered positioning of the nozzle 7.

Furthermore, the connection means 10 comprise a substantially transverse slot 17 formed in the cavity 8, and adapted to guide the support element 16 during insertion thereof into the seat 8.

Figure 5:
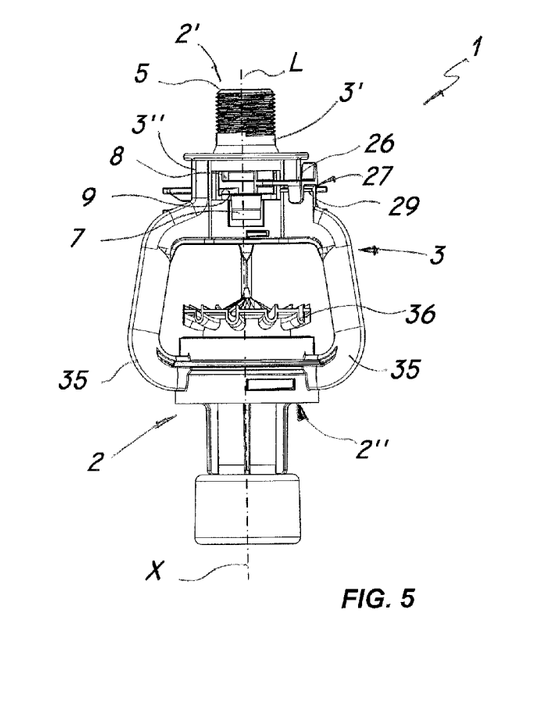
FIG. 5 is a front view of the diffuser of FIG. 3 with the nozzle in a second locked position.

As clearly shown in FIG. 5, the slot 17 has a lower sliding surface 18' and an upper sliding surface 18", which are substantially flat, transverse and parallel, and extend at the periphery of the cavity 7 to such an angular extent as to leave a clear passage 19 for insertion of the nozzle 7.

Furthermore, the slot 17 has a step-like raised peripheral edge 20 extending along the angular extent of the slot 17 and comprises an edge defining the first sliding surface 12.

The support and guide element 16 in turn comprises a plate 21 substantially orthogonal to the longitudinal axis L and having a central hole with the nozzle 7 stably inserted therein.

The plate 21 is adapted to slidingly engage the slot 17 and particularly slides first on the lower flat surface 18 for centered positioning of the nozzle 7.

The cam and follower drive means 11 are designed to allow the plate 21 to rotate in the cavity 8 between the depressed inserted position and the raised operating position, which is rotated relative to the depressed position, to promote axial translation t of the nozzle 7 to contact with the outlet 6 of the passage 4.

Figure 10:
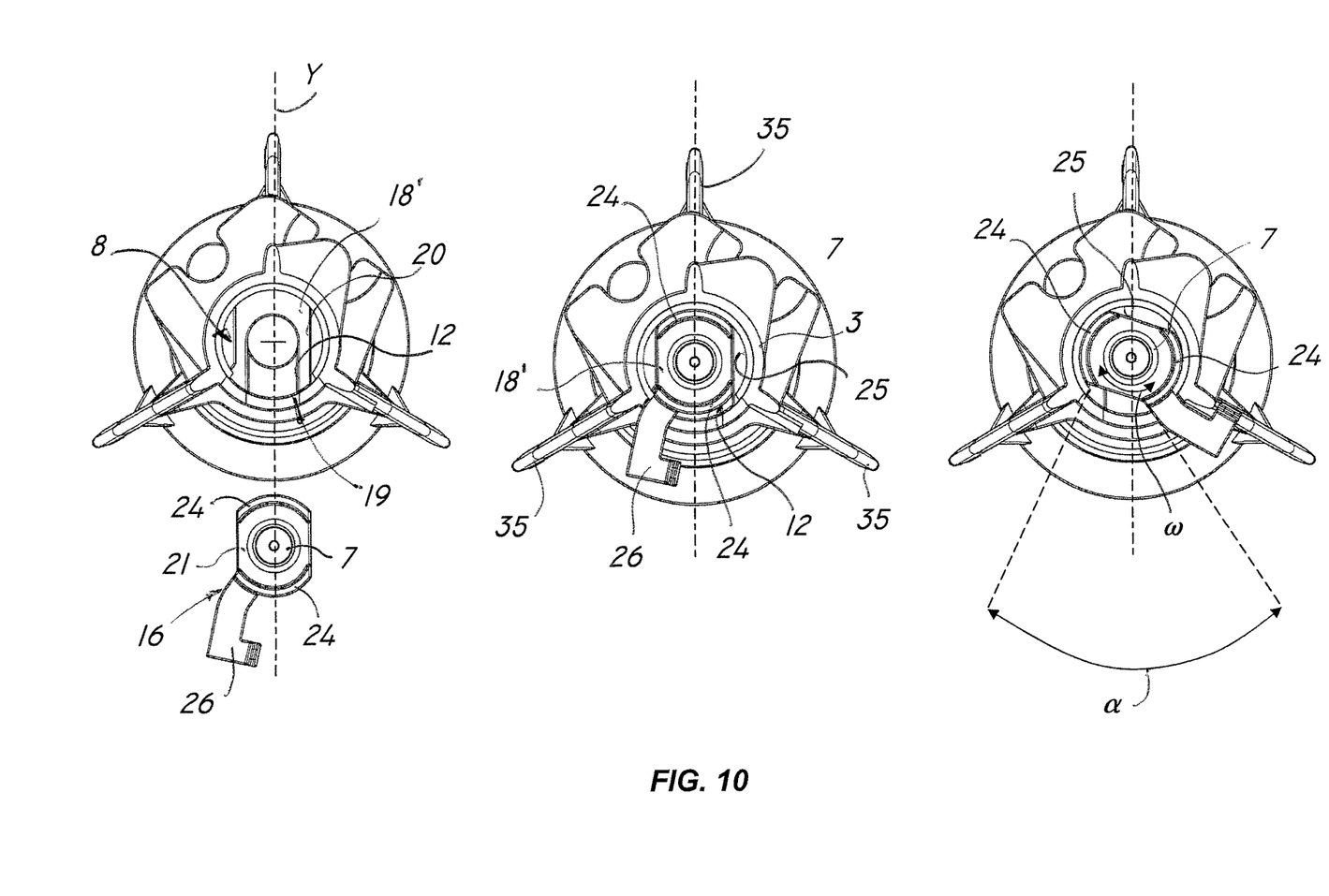
FIG. 10 shows an operation sequence for inserting and locking the nozzle in place with the diffuser being shown in part, and in top sectional view.

Preferably, the maximum rotation angle $\bar{\omega}$ of the plate 21 may range from 30° to 120° and preferably from 40° to 80°, and for instance be about 70°, as shown in FIG. 10.

The plate 21 has a flat lower surface 22 with a tapered peripheral portion 23 comprising the second sliding surface 13 that may form an edge of the tapered portion 23.

The latter is adapted to engage the peripheral edge 20 of the slot 17 such that the two edges 12, 14 are in contact to promote axial translation t of the nozzle 7 after rotation of the plate 21.

Furthermore, once the plate 21 has been translated upwards, its lower surface 22 slides on the upper sliding surface 18" of the slot 17.

The support element 16 also has a substantially axial curved outer peripheral surface 24 for guiding the nozzle 7 during its rotation $\bar{\omega}$.

Preferably, the curved surface 24 has a radius of curvature r that changes along its peripheral length to allow centering of the nozzle 7 in the passage 4.

Particularly, the curved surface 24 has a first section 24' substantially coaxial with the nozzle 7 and a second section 24" whose radius of curvature r" is slightly smaller than the radius of curvature r' of the first section 24'.

Figure 9:
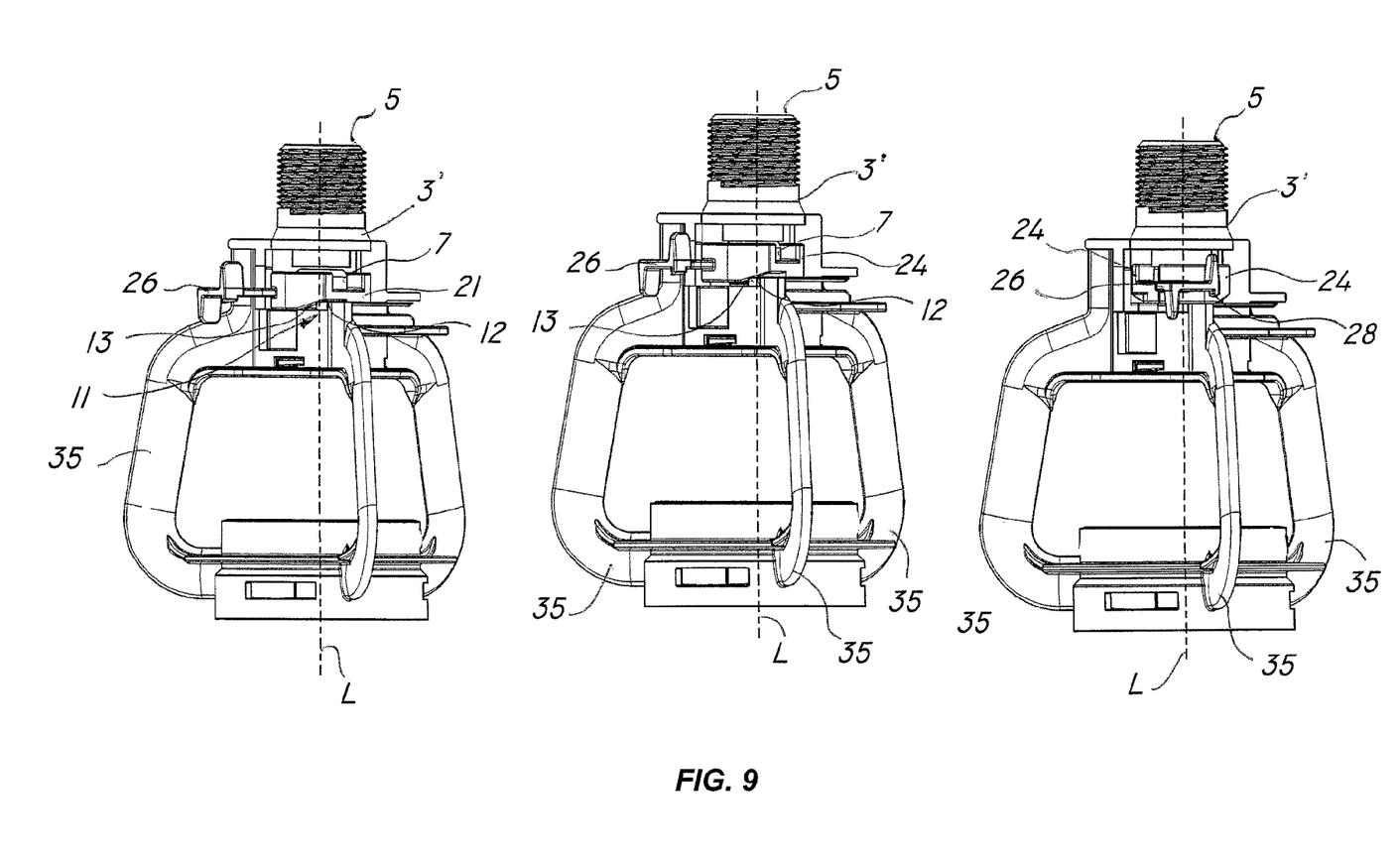
FIG. 9 shows an operation sequence for locking the nozzle with the diffuser being shown in part, and in front view.

Thus, as clearly shown in FIG. 9, the second section 24" defines a lead-in portion for insertion of the plate 21 into the cavity 8, and allows the first section 24' to slide along the side wall 25 of the cavity 8 without sticking into the lateral opening 9, thereby guiding the plate 21 in a centered position.

Conveniently, the support element 16 has a pair of substantially axial curved formations 24, which are symmetric with respect to the longitudinal axis L to ensure proper centering of the nozzle 7, thereby preventing the latter from coming out of the cavity 8 during rotation.

Appropriately, the support element 16 also comprises a substantially radial actuation lever 26, which is adapted to be actuated by a user to promote the rotation $\bar{\omega}$ of the plate 21.

Also, the lever 26 includes means 27 for stable but removable locking of the plate 21 in the raised position.

Particularly, the locking means 27 comprise a tooth 28 associated with one end of the lever 26 and designed for snap engagement of a retaining surface 29 on a radial projection 30 of the main body 3, upon rotation of the lever 26.

Conveniently, the lever 26 has a substantially plate-like shape and can be slightly bent to allow both snap engagement with and release from the retaining surface 29, when the nozzle 7 does not have to be removed.

In this case, it will be simply to remove the lock and rotate the lever 26 integral with the support element 16 in a direction opposite to the inserting and locking direction.

Figure 12:
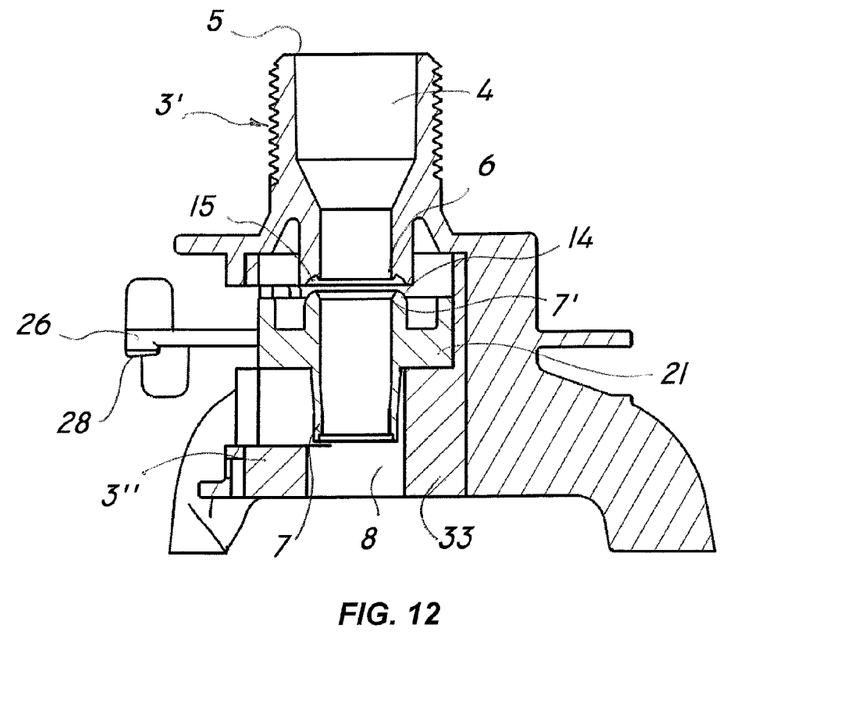
FIG. 12 is a front broken away view of the diffuser with the nozzle in a depressed position.
Figure 13:
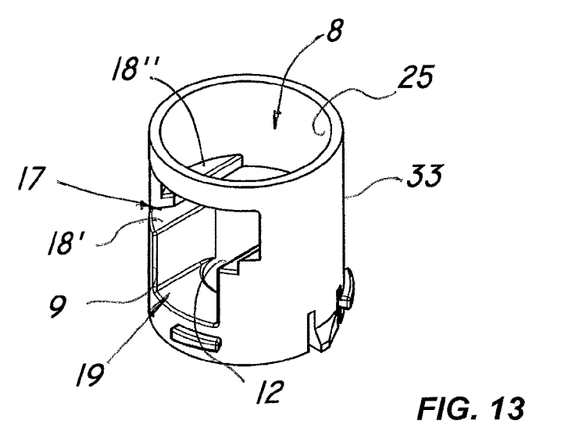
FIGS. 13 and 14 are two distinct perspective views of a bushing that is part of a diffuser of the invention.
Figure 14:
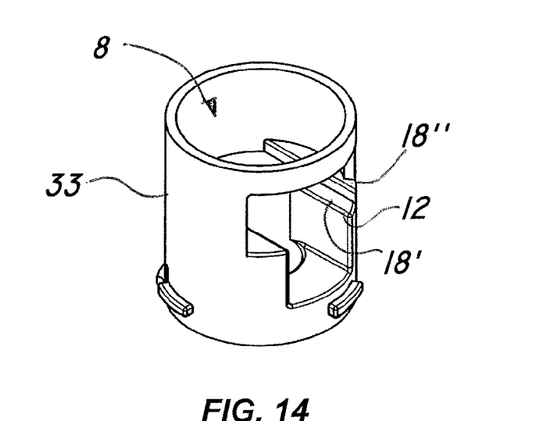
Figure 15:
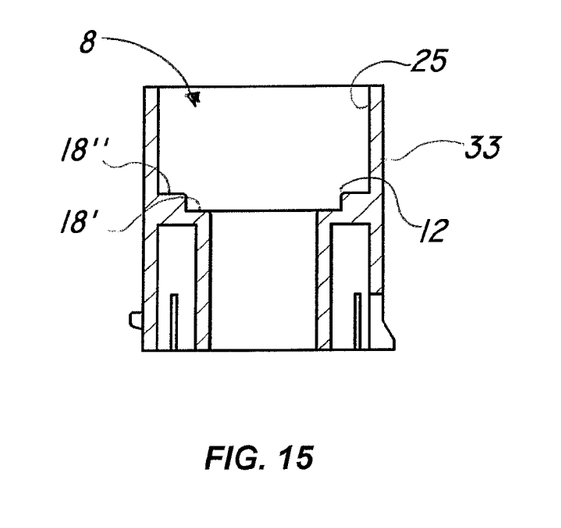
FIG. 15 is a sectional view of the bushing of FIGS. 13 and 14.

In a particularly advantageous aspect of the invention, as more clearly shown in FIGS. 11 and 12, the lower hollow portion 3" houses a substantially cylindrical bushing 33 with the cavity 8 for the nozzle 7 formed therein. The bushing 33 is more clearly shown in FIGS. 13 to 15.

This will avoid the need of directly machining the support frame 2 to form the cavity 8, as a bushing 33 with the cavity 8 may be separately formed and later locked into the frame 2.

As shown in FIGS. 3 to 5, as is typical in sprinkler diffusers, the frame 2 has a deflecting portion 2" integral with the upper supply portion 2" and joined thereto by a plurality of axial elements 35.

The deflecting portion 2" is designed to accommodate jet distributing means, comprising a deflector plate 36 located before the nozzle 7 to deflect and radially distribute the jet.

The plate 36 may be stationary or, like in the illustrated arrangement, it may comprise a support shaft, which is not shown as it is inserted in the tubular deflecting portion 2", allowing it to rotate with a complex motion, composed of a first rotation of the plate 36 about its center axis X and a second rotation of the center axis X relative to the longitudinal axis L, substantially as disclosed, for instance, in the International Application WO2010010535, to afford a wider radial range and more uniform liquid distribution.

An operation sequence for insertion and quick-locking of the nozzle 7 in the diffuser 1 is shown in FIG. 9 and FIG. 10, which show that, once the nozzle 7 has been inserted into the cavity 8 by a substantially transverse sliding motion, it is rotated about the longitudinal axis L by operating the lever 26 until the tooth 28 engages the retaining surface 29 and locks the position of the support element 16 and hence the nozzle 7.

It will be particularly noted that, during the rotation $\bar{\omega}$, the second sliding surface 13 associated with the plate 21 abuts against the edge 20 of the slot 17 to slide on the first sliding surface 12 and cause gradual raising of the plate, resulting in the axial translation t of the nozzle 7.

On the other hand, FIG. 11 shows the nozzle 7 in its depressed position, corresponding to the inserted state of the plate 21, and in its raised position, with the plate 21 having been fully rotated.

The above disclosure shows that the diffuser of the invention fulfills the intended objects and particularly meets the requirement of allowing connection and quick removal of the nozzle, while constantly allowing a proper sealing effect without the use of a seal.

The diffuser of the invention is susceptible of a number of changes and variants, within the inventive concept disclosed in the appended claims. All the details thereof may be replaced by other technically equivalent parts, and the materials may vary depending on different needs, without departure from the scope of the invention.

While the diffuser has been described with particular reference to the accompanying figures, the numerals referred to in the disclosure and claims are only used for the sake of a better intelligibility of the invention and shall not be intended to limit the claimed scope in any manner.

The invention claimed is:

1. A jet diffuser with quick-change nozzle for use on irrigation plants (I) with substantially vertical drop pipes (R), which diffuser comprises:
   an upper supply portion (2') and a lower diffusing portion (2"), wherein said upper supply portion (2') comprises:
   a main body (3) having an upper tubular portion (3') with a longitudinal axis (L) configured to be directly coupled to a respective drop pipe (R) and a lower hollow portion (3") with a side wall (3''') and a central cavity (8);
   a lateral opening (9) formed in said side wall (3''') of said lower hollow portion (3");
   a substantially tubular nozzle (7) adapted to be radially inserted through said lateral opening (9) and placed in said central cavity (8) in substantially coaxial and facing relationship to said upper tubular portion (3') to direct a liquid jet axially downward;
   a quick-connect system (10) associated with said nozzle (7) for fixing said nozzle within said main body (3);
   wherein said lower diffusing portion (2") comprises a diffusing element (36) for diffusing an outflowing jet from said nozzle (7); and
   wherein said quick-connect system (10) comprises cam follower drive elements (11) acting on said nozzle (7) to move and push said nozzle axially upward substantially into contact and in sealing relationship to a lower edge (15) of said upper tubular portion (3'), said cam follower drive elements comprising a first sliding surface (12) defined in said cavity (8) and a second sliding surface (13) defined on a lower portion of a support element coupled to and supporting said nozzle (7), so as to cause the nozzle to move axially upwards upon rotation about the longitudinal axis of said second sliding surface (13) against said first sliding surface.

2. The jet diffuser as claimed in claim 1, wherein said drive elements (11) comprise a substantially transverse slot (17) formed into said cavity (8) and adapted to guide said guide and support element (16), said slot (17) having a peripheral edge (20) defining said first sliding surface (12).

3. The jet diffuser as claimed in claim 2, wherein said guide and support element (16) comprises a substantially transverse plate (21) adapted to slidably engage said slot (17).

4. The jet diffuser as claimed in claim 3, wherein said drive elements (11) are adapted to allow rotation (ω) of said plate (21) into said slot (17) between a depressed inserted position and a raised operating position, which is rotated with respect to said depressed position, and to promote axial translation (t) of said nozzle (7) to contact engage with said lower edge (15) of said upper tubular portion (3').

5. The jet diffuser as claimed in claim 4, wherein said plate (21) has an at least partially tapered lower surface (22) comprising said second sliding surface (13) and adapted to engage said peripheral edge (20) of said slot (17) to promote said axial translation (t) of said nozzle (7) during upon said rotation (ω).

6. The jet diffuser as claimed in claim 4, wherein said guide and support member (16) has at least one outer peripheral surface (24) that is substantially curved, axial, adapted to guide said nozzle (7) during said rotation (ω), and having a radius of curvature (r) variable along its peripheral extension.

7. The jet diffuser as claimed in claim 4, wherein said guide and support member (16) comprises a substantially transverse actuation lever (26) adapted to be actuated by a user to promote rotation (ω) of said plate (21).

8. The jet diffuser as claimed in claim 7, wherein said lever (26) comprises a locking member (27) for stably and removably locking of said plate (21) in said raised operating position.

9. The jet diffuser as claimed in claim 8, characterized in that said locking member (27) comprises a tooth (28) associated to said lever (26) and designed for snap engagement of a retaining surface (29) integral with said main body (3) upon maximum rotation of said lever (26).

10. The jet diffuser as claimed in claim 1, wherein said upper tubular portion (3") comprises a substantially cylindrical bush (33) enclosing said cavity (8).

11. The jet diffuser as claimed in claim 1, wherein said nozzle (7) has a flared upper edge (14), said lower edge (15) of said upper tubular portion (3') being complementary shaped with respect to said upper edge (14) of said nozzle (7) for sealingly coupling therewith upon translation (t) of said nozzle (7).

12. The jet diffuser as claimed in claim 1, further comprising a sealing member interposed between said nozzle and said lower edge of said upper tubular portion.

* * * * *